Feb. 20, 1940.　　　　W. C. PROTZ　　　　2,191,041
ORNAMENT
Filed April 21, 1937　　　3 Sheets-Sheet 1
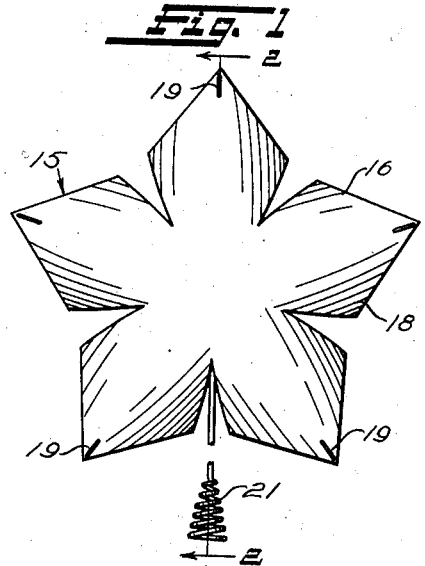
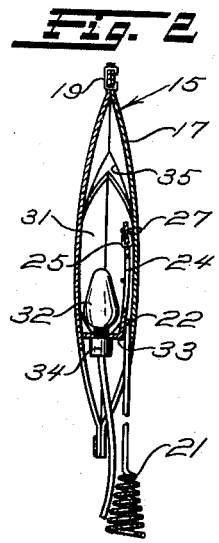
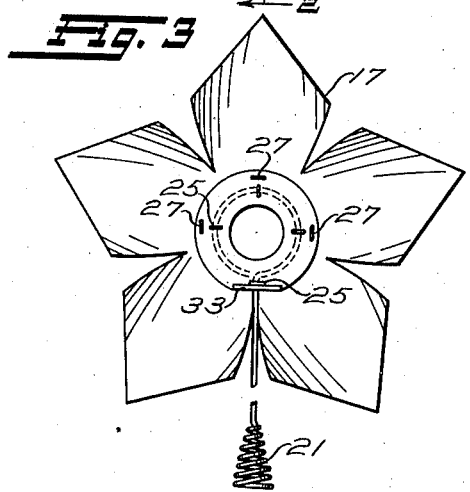
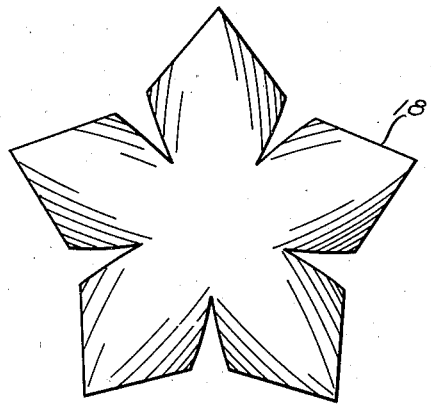
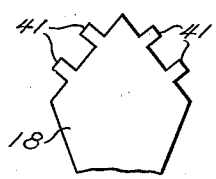
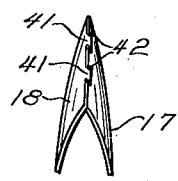
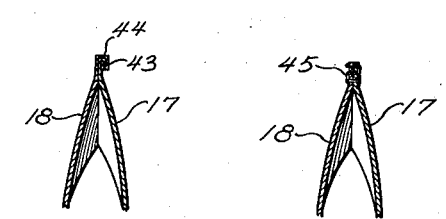
Inventor
William C. Protz
By Strauch & Hoffman
Attorneys Feb. 20, 1940. W. C. PROTZ 2,191,041
ORNAMENT
Filed April 21, 1937 3 Sheets-Sheet 2

Inventor
William C. Protz
By Strauch & Hoffman
Attorneys

Feb. 20, 1940.　　　　W. C. PROTZ　　　　2,191,041
ORNAMENT
Filed April 21, 1937　　　3 Sheets-Sheet 3

Inventor
William C. Protz
Strauch & Hoffman
Attorneys

Patented Feb. 20, 1940

2,191,041

UNITED STATES PATENT OFFICE 2,191,041

ORNAMENT

William C. Protz, Manitowoc, Wis., assignor to National Tinsel Manufacturing Company, Manitowoc, Wis., a corporation of Wisconsin Application April 21, 1937, Serial No. 138,237

3 Claims. (Cl. 41—10)

This invention relates to a novel ornament and methods of manufacture thereof, and more particularly to an ornament designed to be employed in combination with illuminating means on a Christmas tree or the like.

Prior ornaments of the general type herein described have been relatively complex in structure and have involved relatively complicated parts difficult to assemble. Consequently such ornaments have been expensive to manufacture. Further the effects produced thereby when illuminated have not been unusually distinctive or attractive.

In overcoming these disadvantages of the prior art and producing an especially attractive article, it is an object of this invention to provide a novel ornament formed of a minimum of relatively simple parts that may be easily assembled and the complete ornament produced at very low cost.

A further object of the present invention is the provision of a novel ornament for use in combination with illuminating means, the construction of the ornament being such as to produce new and unusual lighting effects.

A further object of the present invention is the provision of a novel ornament in combination with illuminating means, a portion of the ornament being substantially solid to serve as a reflecting means for ray-like apertures or like openings in other portions of the ornament.

Still a further object of the present invention is the provision of an ornament of novel construction for use in combination with illuminating means, the combination providing an unusual and attractive corona or halo effect.

A further object of this invention is the provision of an ornament of novel and simple construction, easily susceptible of change in design to produce a number of unusual and attractive effects when used in combination with illuminating means.

Still further objects of this invention reside in the provision of novel methods of manufacture of ornaments whereby relatively simple and inexpensive elements may be readily and cheaply formed into attractive articles.

With the foregoing and other objects in mind as will appear from the following description and appended claims, reference is made to the attached drawings wherein:

Figure 1 is a front elevation of a preferred embodiment of the invention, the ornament illustrated being for use as a tree top for a Christmas tree.

Figure 2 is a section taken on line 2—2 of Figure 1 in the direction of the arrows.

Figure 3 is an elevation of the inside of an element of the ornament of Figures 1 and 2.

Figure 4 is an elevation of the inside of another element of the ornament of Figures 1 and 2.

Figures 5, 6, 7 and 8 are fragmental details of several modified forms of securing means, preferably employed to connect the several parts of ornaments embodying this invention.

Figure 9:
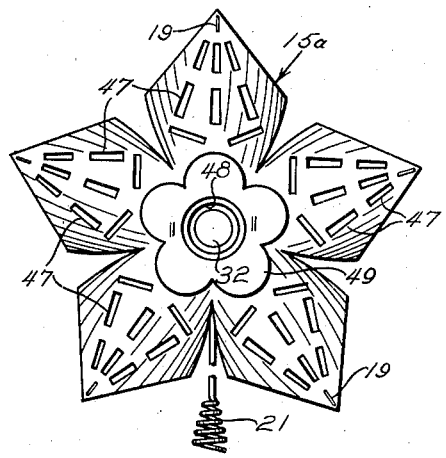
Figure 10:
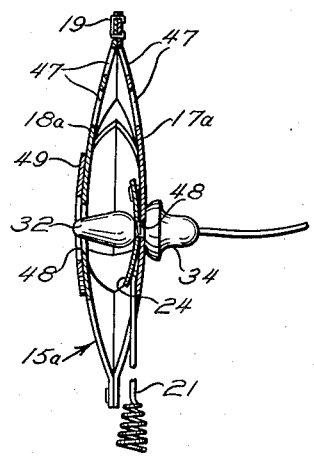

Figures 9 and 10, respectively, are elevational and sectional views similar to Figures 1 and 2 showing a further preferred embodiment of the invention.

Figure 12:
Figure 11:
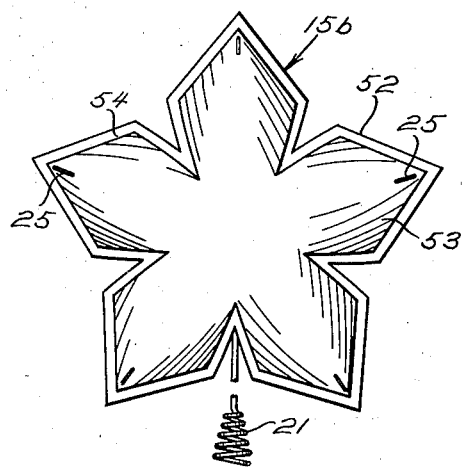
Figure 13:
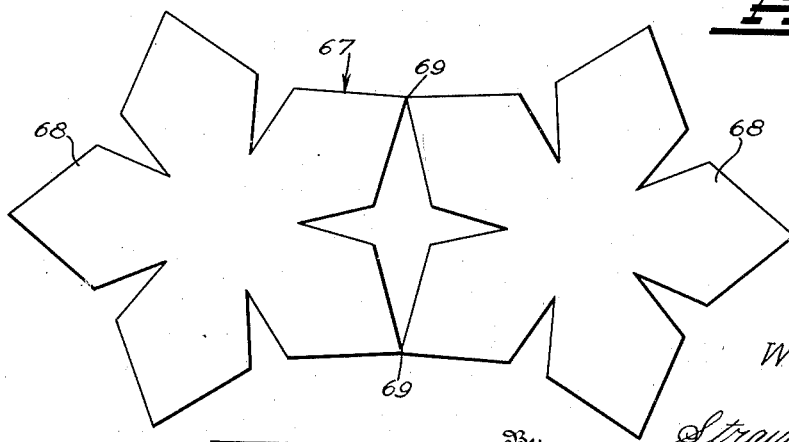

Figures 11 and 12 are elevations of still further embodiments of the invention, and Figure 13 is a plan of a blank preferably employed in carrying out the novel method herein described.

Figure 14:
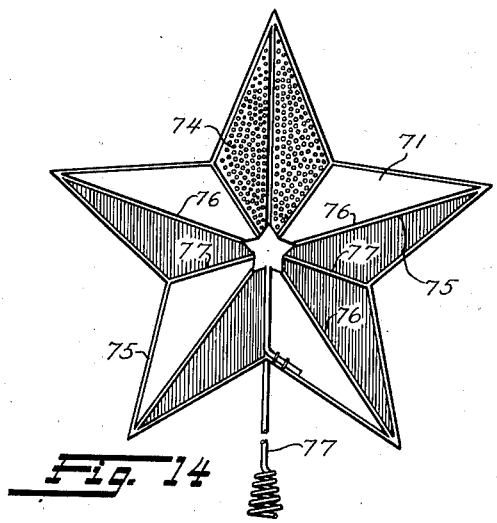

Figure 14 is a front elevation of a further preferred embodiment of the invention.

Figure 15:
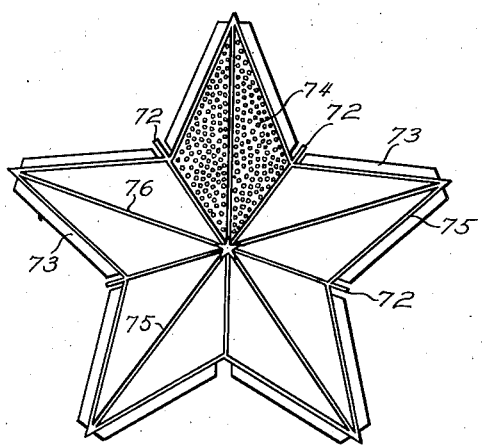

Figure 15 is an elevation of one of the elements forming the ornament of Figure 14.

Figure 16:
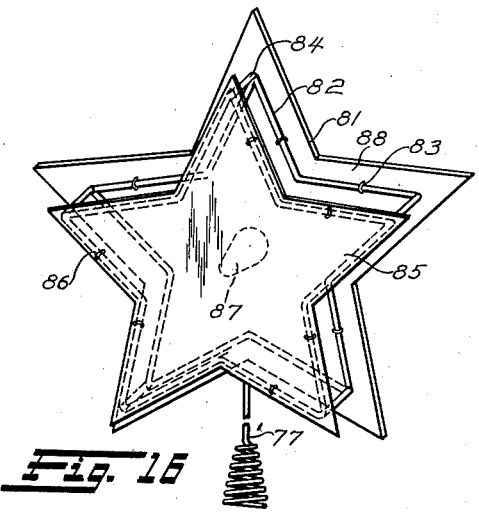

Figure 16 is a perspective of a further preferred modification resembling in some particulars the ornament of Figure 11.

Figure 17:
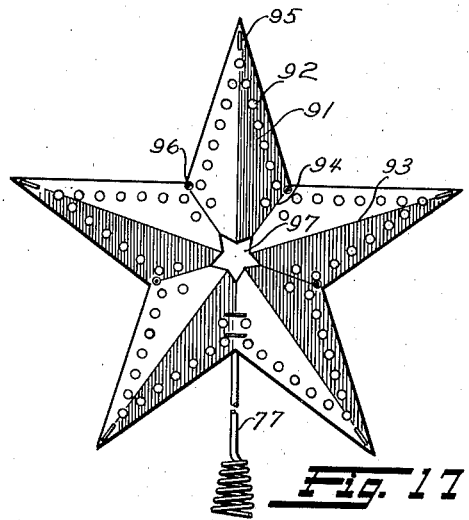

Figure 17 is a front elevation of a further modification of the invention generally resembling the ornament of Figure 14.

Figure 18:
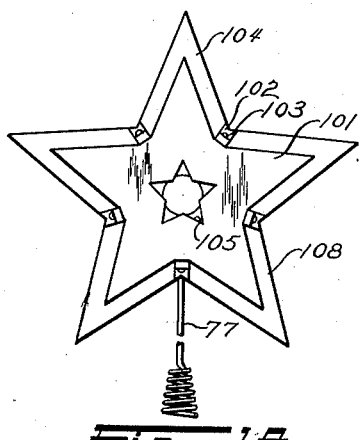
Figure 19:
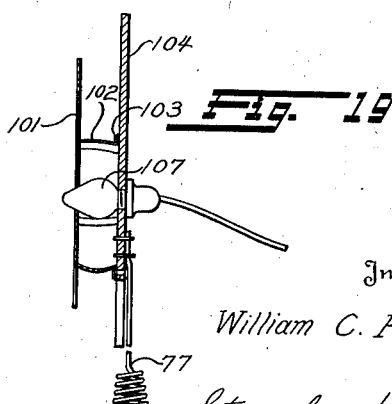

Figures 18 and 19 are front elevation and vertical section, respectively, of a further modified form of the invention.

With continued reference to the drawings wherein like reference characters are employed to designate the same parts throughout the several figures, Figures 1 and 2 illustrate a preferred form of ornament embodying the present invention.

Ornament 15, which may be of any desired configuration such as a maple leaf, Maltese cross, star, moon or the like, comprises a hollow body 16 made up of a plurality of similarly shaped dished or bowed members 17 and 18 joined together at selected points by suitable means such as rivets or staples 19 or a suitable adhesive. Members 17 and 18 may be formed of stiff paper covered with metal foil, or similar material, aluminum foil being preferred, and are dished or bowed as shown in Figure 2, the several projecting portions being also bowed along their longitudinal axes as shown by the shading in Figures 3 and 4 to form substantial ellipses in cross section. If desired the bowing or dishing may be such as to produce polygonal cross section of the body of the ornament or the several projecting portions or both and it is to be understood that the terms bowed or dished as employed herein are intended to embrace such modifications.

Ornament 15 may also be cast out of glass, such as the so-called resin glass, usually a condensation product of formaldehyde and phenol and/or urea. In such case, the elements 17 and 18 may be cast individually and subsequently assembled or the entire ornament may be cast as a single piece.

Elements 17 and 18 are preferably fastened together at their outer edges by staples 19. The location of the staples may be varied as desired and as is found convenient without departing from the spirit of the invention. Member 17, hereinafter referred to as the rear member as distinguished from member 18, called the front member, is provided with a supporting element 21. The latter comprises a wire or like means having one end bent in the form of a loop 22 secured to an annulus 24 of cardboard or similar material by staples 25. Annulus 24 is in turn secured by staples 27 to the inner face of member 17. If desired, the annulus may be fastened to the outer face of member 17 or loop 22 may be secured direct to member 17, eliminating the annulus. The lower end of element 21 is preferably formed as a hollow resilient cone to be mounted upon a Christmas tree.

In assembling the ornament, members 17 and 18 are placed with their dished faces in opposition and secured together, preferably at the ends of the projections. By reason of the dished and bowed character of the members, a substantial space 31 is formed between the members, the space extending along the longitudinal axes of the several projecting portions. If desired either the element 17 or 18 may be made smaller than the remaining element so that when the elements are assembled, and secured together at their peripheries, the larger member will necessarily assume a bowed or dished shape to form a space in the cast of the ornament.

While ornament 15 as thus far assembled presents an unusual and attractive appearance, the appearance is much improved by the use of illuminating means in combination with the ornament. Such means may be provided by a bulb 32 of the type commonly used on Christmas trees and in decorative lighting. To this end, annulus 24 may be provided with a fork-like tab 33 extending normal to the plane of the annulus, the arms of the fork being dimensioned to receive the base of bulb 32 and be gripped between the bulb and a suitable socket 34 when the bulb is screwed in place. This method of securing bulb 32 in space 31 is to be understood as only by way of example and other methods may be employed as will be hereinafter shown.

Ornament 15 as shown in Figure 1 is intended for use as a top for a Christmas tree and when illuminated as described is characterized by a corona effect, light rays being emitted from bulb 32 through the several spaces 35 formed about the edges of the ornament. By reason of the employment of metal foil or similar means for both the inside and outside of the ornament, the light rays are reflected and re-reflected a number of times. This characteristic in combination with the use of colored metal foils and light bulbs of different colors provides means for a number of different effects. If desired, the edges of the ornament may be serrated to produce alternately arranged light openings.

While the ornament 15 is preferably used as a tree top, it may also be used as an ornament for a window or door, on a table or like means or be suspended from a suitable support. The ornament may likewise be made of any desired shape and design so as to render it appropriate for different occasions.

In place of staples 19, members 17 and 18 may be secured by different means as shown in Figures 5 to 8, inclusive. In Figures 5 and 6, member 18 is shown with integral lugs 41 which may be bent over and inserted in slots 42 in member 17 or be bent around the outer edges of member 17.

Another modified form of securing means is illustrated in Figure 7, wherein members 17 and 18 are provided with complementary tabs 43 and 44 which are superposed upon one another, and folded together and crimped as shown. In lieu of tabs 43 and 44, the outer edges of the members 17 and 18 may be folded and crimped for a substantial portion of their periphery.

A still further modified form of securing means is shown in Figure 8, wherein a series of stitches 45 are employed for sewing the edges of members 17 and 18 together.

A further preferred embodiment of the present invention is shown in Figures 9 and 10. In this modification, members 17a and 18a, corresponding to members 17 and 18 of the ornament of Figure 1, may be secured together by any of the securing means hitherto shown. Members 17a and 18a are provided as shown with elongated apertures 47, resembling light rays, the apertures 47 being formed in any suitable design. These apertures are designed to emit light from the illuminating means to further enhance the appearance of the ornament.

In Figure 10, a modified form of fastening means for bulb 32 is shown. As shown in Figure 10, members 17a and 18a are formed with centrally disposed aligned apertures 48. The bulb 32 is inserted through the aperture in the front member and screwed into socket 34 which is positioned at the rear of the rear member. When the bulb is screwed into its socket, the portion of the rear member adjacent its aperture 48 is gripped between the bulb and the socket. If the bulb be of relatively small size, it will lie entirely in the space formed between the two elements. If an elongated bulb be employed as shown at 32 in Figure 10, the front portion of the bulb will extend through the aperture 48 in the front member to produce an unusual lighting effect. If desired, the aperture in annulus 24 may be of a size approximating that of the threaded portion of the bulb whereby the annulus 24 and rear member 17a, spaced by the loop of wire 21, will serve as resilient means of substantial thickness to be gripped between the bulb and its socket.

In addition to the corona effect of Figure 1, the ornament shown in Figures 9 and 10 produces an unusual effect by reason of the apertures which simulate light rays and by reason of the central opening.

Ornament 15a of Figure 9 is preferably embellished by decorative members 49 of suitable configuration which may be secured to the central portion of both the front and rear members adjacent apertures 48. Any suitable means, such as staples may be employed to secure the members 49 in place. Members 49 are preferably formed of a color contrasting with that of the main body of the ornament.

The appearance of the ornament may be varied, if desired, by providing the apertures with a layer of light transmitting material such as colored Cellophane or the like. By using transparent or translucent material of different colors, extremely attractive effects can be obtained.

The ornament is preferably provided with metal foil both upon the inner and outer surfaces thereof. If desired, the rear element may be formed solid with no apertures 47 whereby the reflecting characteristic thereof is increased.

The ornaments of Figures 1 and 9, may also be employed as candle holders. To this end, the wire support 21 is omitted and the element layed flat, upon a table or similar support. The bottom of the candle is suitably supported on the rear member, the candle projecting through an aperture formed in the front member.

In Figure 11 a further modification of the present invention is shown wherein a pair of oppositely disposed and dished members 52 and 53 are employed. Preferably these members are of similar shape, the rear member 52 however being slightly larger than the front member 53. The members 52 and 53 are secured together as by staples 25 with their centers in axial alignment, thus forming a border 54 completely surrounding the front member 53. By reason of the surfaces of the members being formed of reflecting material, when a suitable source of light is employed in the center of the ornament, a lighted border is formed about the periphery of the front element, producing a complete border of light simulating a corona or halo effect. The front member 53 may be perforated as seen in Figures 9 and 10 in order to simulate the ray effect of the elements shown at 15a. Other types of perforations of round, oblong or other shape may be employed in regular or irregular designs.

A further embodiment of the present invention is shown in Figure 12. In this form of the invention the ornament comprises a pair of suitably dished or bowed members 63, corresponding to members 17 and 18 of Figure 1, and joined together by any suitable means. Each of the members 63 is provided with suitable indicia such as letters 64 arranged to form an appropriate greeting. Letters 64 may be formed by cutting out portions of the members 63, the inner surface of members 63 being then provided with a thin sheet of light transmitting material 65 such as Cellophane or the like to form a background. Thus when a bulb is positioned between the members 63, the greeting is effectively displayed. If desired, elongated apertures may be provided in the element 63 and an under layer of transparent or translucent material provided upon which the indicia is printed or otherwise applied. Or other cutouts resembling the moon or stars can be made in both or only one of the members.

In Figure 13 I have shown a preferred method of forming the ornament of the present invention wherein the several sections thereof are formed integral and of a single blank. The blank 67 so formed with or without perforations, as desired, comprises a pair of elements 68 joined together at extremities 69. After the blank 67 is stamped out or otherwise formed and the portions thereof bowed as desired to impart the dish shape to the ornament and the projections thereon, the blank may be folded about the connecting points 69 whereby the several projections 68 will coincide one with the other to form the ornament. Obviously this reduces the labor involved in securing the elements together and also insures exact alignment of the several parts.

Referring to Figures 14 and 15, a further modified form of the invention is shown wherein a hollow star or ornament of any desired shape is formed in much the same manner as the ornament of Figures 1 and 2. Ornament 71 of Figures 14 and 15 is preferably formed of thin tin, metal foil or like material, each element of the ornament being formed from a blank of the type shown in Figure 15.

The front element, shown in Figure 15, differs from the rear element in that it is preferably stamped with extending lugs 72 and flanges 73. After the stamping operation wherein the holes 74, preferably in the form of a regular pattern in the blank to simulate lace or filigree work, are formed, the blank is bowed in a number of planes in the same general manner as the blanks forming the ornament of Figure 1, except that the dies or similar tools used to bow the blanks are designed to produce outlining ribs or corrugations 75 surrounding the several sections thereof.

Certain of the ribs such as ribs 76 run from the center of the ornament to the tips of the points or from the point of maximum bowing to the most distant point of contact of the elements of the ornament, while other ribs such as ribs 77, running from the center of the ornament to other points of contact of the elements, are not so long. The result is a series of star or ornament points with an accentuated bowing or polyhedral shape in cross-section at the center proceeding gradually to no bowing at the tips of the points.

In assembling the ornament of Figures 14 and 15, after the elements are bowed, they are placed with the cupped faces opposing, the lugs 72 of the one element being bent over the edges of the other element to align the respective elements and secure them temporarily. Following this operation, the flanges 73 of the one element are bent over the edges of the remaining element, the result being a rigid and secure ornament. To permit of support of the ornament from a Christmas tree, it is provided with a wire support 77 of the same type as support 21 of Figure 1. Suitable means may be provided on either of the elements for mounting illuminating means.

By reason of the perforations and the fact that the ornament is completely closed around its periphery, the ornament 71, when illuminated, presents a very attractive appearance. Since all the surfaces are reflecting surfaces, the light rays proceeding from the source of illumination are reflected and re-reflected a number of times.

In Figure 16, a further modified ornament of the present invention is shown in perspective. The ornament of Figure 16 comprises a rear element 81. While element 81 is preferably made flat, it is understood that it may be bowed as desired. A frame 82 of wire or similar material is secured as by staples 83 to element 81. To the front face of wire frame 82, the faces of which are connected by cross members 84, a second element 85, preferably of the same shape as element 81, but smaller than element 81, is secured to frame 82 by suitable staples 86. Element 85 is preferably formed solid with no perforations therein while element 81 has its inside surface formed as a reflecting surface.

When an illuminating means 87 is employed between the two elements, no light passes through front element 85 but a halo or surrounding annulus of light is formed by the over-extending border 88 of element 81 which extends outwardly past the edges of element 85.

In Figure 17 a modified form of the ornament of Figures 14 and 15 is disclosed. Ornament 91 of Figure 17 is formed of two elements or blanks, stamped flat with desired apertures 92 therein and subsequently bowed along a number of lines to produce raised portions generally indicated at 93 and depressed portions at 94. The elements of Figure 17 are not formed with either lug 72 or flanges 73 of Figure 15, but are formed alike so that only one stamp is required for both elements of the ornament.

After the elements have been bowed or bent as desired, they are secured at the tips of the star points by suitable staples 95 and at the innermost portions of the periphery by hollow rivets 96 or the like.

This construction provides a hollow ornament which is completely closed around its periphery, the periphery also being bordered by a series of apertures as shown. When a source of illumination such as a light bulb is placed in the interior of the ornament, a pleasing effect is provided by reason of a central aperture 97, which may be of any shape desired, and apertures 92 positioned adjacent the periphery of the element.

In Figure 18 a modified form of the ornament shown in Figure 16 is illustrated, a vertical section thereof being shown in Figure 19. In the ornament of Figures 18 and 19, a front element 101 is stamped with a series of extending lugs 102, which are bent and secured by rivets 103 to a rear element 104, the latter element being of a size to extend beyond element 101 at all points. Element 101 may be provided with an aperture 105 of suitable design as shown in Figure 18. When illuminating means such as bulb 107 mounted on rear element 104 is provided, aperture 105 presents an attractive appearance in addition to the halo effect that is obtained by the illumination of the extending border 108 of element 104, completely surrounding the edges of element 101. The ornament of Figure 18 is less expensive and easier to make than the ornament of Figure 16 in that no frame is required, either the front or rear element being formed with means to connect the two elements in spaced relation.

In the ornaments shown in Figures 16, 17 and 18, suitable means may be employed for securing the ornament to a Christmas tree or the like as shown at 77 and described in detail in connection with Figure 14.

Summarizing the advantages of the present invention, it is to be noted that by reason of the relatively simple character of the elements employed, an inexpensive and yet attractive ornament can be produced with a minimum number of parts. By reason of the dished or bowed character of the several elements and the projections thereon when such are employed, a resulting effect is obtained which has hitherto been approached only in more expensive ornaments. While the ornament of the present invention is much less expensive than ornaments of a similar type heretofore produced, new and unusual decorative effects are produced especially when the element is used in combination with illuminating means as has been described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An ornament comprising a pair of similarly formed generally star-shaped dished elements arranged with their dished faces in opposition so as to provide a substantially unobstructed space therebetween, each of said elements being made of a relatively flexible opaque material which is capable of retaining a given shape and flange means extending along the major portion of the periphery of one of said elements and adapted to be bent about the adjacent periphery of the other of said elements for securing said elements together, said elements having a multiplicity of small light-emitting apertures formed therein.

2. A star ornament comprising a pair of generally star-shaped dished elements of substantially the same size arranged with their dished faces in opposition and their peripheries in matched contact, means for securing said elements together comprising fastening means extending between said elements at said peripheries, each arm of said assembled star having a plurality of flat sloping faces arranged in such a manner that said arms are each generally pyramidal in shape and each of said faces being provided with a multiplicity of relatively small light-emitting apertures, means secured to one of said elements providing a lamp mounting within the space between said elements and a support secured to said lamp mounting and extending downwardly between said elements to terminate in a seating portion for mounting said ornament in upright position upon a Christmas tree or the like.

3. An ornament comprising a pair of similar, generally star-shaped dished elements arranged with their dished faces in opposition so as to provide a substantially unobstructed space therebetween, each of said elements being made of light, bendable metal which is capable of retaining a given shape; and integral flange means extending along the entire periphery of one of said elements, said flange means being bent to overlie the adjacent periphery of said other element for securing said elements together.

W. C. PROTZ.